United States Patent [19]

DiMatteo et al.

[11] Patent Number: 4,533,828
[45] Date of Patent: Aug. 6, 1985

[54] ARRANGEMENT FOR INCREASING THE DYNAMIC RANGE OF OPTICAL INSPECTION DEVICES TO ACCOMMODATE VARYING SURFACE REFLECTIVITY CHARACTERISTICS

[75] Inventors: Paul DiMatteo, Huntington; Joel Hecker, Port Jefferson Station, both of N.Y.

[73] Assignee: Robotic Vision Systems, Inc., Hauppauge, N.Y.

[21] Appl. No.: 446,712

[22] Filed: Dec. 3, 1982

[51] Int. Cl.³ .............................................. H01J 3/14
[52] U.S. Cl. .................................... 250/216; 250/578
[58] Field of Search .................. 250/216, 578; 355/11; 358/107, 225; 350/169–171; 357/31–32

[56] References Cited

U.S. PATENT DOCUMENTS

T103,801  1/1984  Grant et al. .......................... 250/578
4,141,625  2/1979  Pickar et al. ......................... 350/171
4,272,684  6/1981  Seachman ............................. 250/578

Primary Examiner—David C. Nelms
Assistant Examiner—J. Gatto
Attorney, Agent, or Firm—Max Fogiel

[57] ABSTRACT

An arrangement of partially reflecting mirror surfaces to extend the dynamic range of area sensor arrays as used in optical measurement systems. An instantaneous optical AGC allows a single area sensor to be used in inspection systems where surface reflectivities and characteristics may vary from diffuse to mirror-like. The partially reflecting mirrors instantaneously superimpose on the area sensor a set of spatially displaced energy related images of the inspection pattern. Electronic readout of the sensor and subsequent data processing allows selection of portions of each image which represent the linear non-blooming operating range of the sensor.

8 Claims, 6 Drawing Figures

ARRANGEMENT FOR INCREASING THE DYNAMIC RANGE OF OPTICAL INSPECTION DEVICES TO ACCOMMODATE VARYING SURFACE REFLECTIVITY CHARACTERISTICS

BACKGROUND OF THE INVENTION

The present invention relates to methods of optically extending the dynamic range of sensor arrays for use in optical inspection systems, where surface characteristics and reflectivity variations can cause variations of radiant energy in excess of 60 DB.

In an optical inspection system of the aforementioned species, there is provided a projector module which includes an illumination source and optics required to generate a plane of illumination at the inspection volume. A camera module which is angularly displaced from the projector module includes a TV camera and focusing optics. The focusing optics images that portion of the illumination plane which passes through the inspection volume. The TV camera is positioned so that the plane of its photosensitive array coincides with the camera optics image plane. When an object is placed in the inspection volume so as to intersect the projected plane, a contour of the surface is illuminated and imaged, by the camera optics, on the camera sensitive area. The area array consists of a matrix of photosensitive sites called pixels which are organized into horizontal rows and vertical columns. Electronics circuitry within the camera reads the data in each pixel sequentially across each row until the entire matrix of pixels is read out. The image of the inspection contour on the pixel array results in charge accumulation in those pixels which receive radiant energy from the image. Since the pixels are read out sequentially, the spatial locations of those pixels which were illuminated by the image can be determined. Spatial data on the image plane corresponds via camera optics into spatial data in the object or, in this case, illumination plane. Therefore, from a determination of which pixels were illuminated, spatial information concerning the object contour can be determined. The collection of this spatial data as the object is sequentially moved across the illumination plane results in a set of surface data which completely describes the three-dimensional characteristics of the surface.

To maximize the accuracy of such optical inspections, the pixel illuminated must be accurately determined. Sensors available today have several problems which limit system performance. They include dynamic range limitations of the sensor arrays and charge bleeding or blooming of pixels which are overdriven. The nominal dynamic range presently available from photosensitive arrays is limited to approximately 40 db. However, restraints due to real-time processing further limits the available range resulting in a useful dynamic range of approximately 26 db. Surface characteristics and reflectivity variations can result in energy variations in excess of 60 db. Most objects which have local curvatures or edges can result in reflected energy which varies in excess of 26 db over the inspected height or with angular position with respect to the projected plane. The 26 db sensor capability, therefore, severely limits the inspection capabilities. In addition, when the radiant energy exceeds the dynamic range charge accumulated in the pixel bleeds into adjacent rows and columns degrading or masking the dimensional data. A possible solution to the above problems is to take many inspections at varying transmitted radiant energy levels. This, however, is very time-consuming and requires an object to be stationary during the inspection.

SUMMARY OF THE INVENTION

The object of the present invention is achieved by providing an increased inspection capability by making the inspection independent of surface characteristics and reflectivities by extending the dynamic range of the camera module.

According to the present invention, there is provided a single area image sensor, and a source of radiant energy for illuminating an object. The radiant energy is directed from the object to the image sensor. A plurality of mirrors with partially reflecting surfaces all located in the path of the radiant energy for superimposing instantaneously a set of spatially displaced energy-related images of the object. Electronic read out of the sensor and subsequent data processing allows selection of portions of each image which represent the linear non-blooming operating range of the sensor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
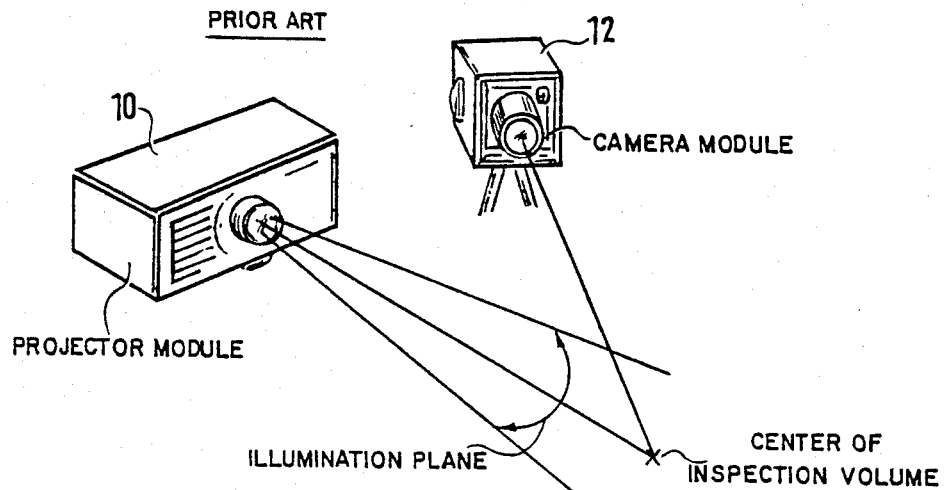
FIG. 1 is a schematic view of an optical inspection system related to the present invention.

Referring to the drawings, an optical inspection system is shown in FIG. 1. The projector module 10 includes an illumination source and optics required to generate a plane of illumination at the inspection volume. The camera module 12 includes a TV camera and focusing optics. The focusing optics images that portion of the illumination plane which passes through the inspection volume. The TV camera is positioned so that the plane of its photosensitive array coincides with the camera optics image plane. When an object is placed in the inspection volume so as to intersect the projected plane, a contour of the surface is illuminated and imaged, by the camera optics, on the camera sensitive area. The area array consists of a matrix of photosensitive sites called pixels which are organized into horizontal rows and vertical columns. Electronics circuitry within the camera reads the data in each pixel sequentially across each row until the entire matrix of pixels is read out. The image of the inspection contour on the pixel array results in charge accumulation in those pixels which receive radiant energy from the image. Since the pixels are read out sequentially, the spatial locations of those pixels which were illuminated by the image can be determined. Spatial data on the image plane corresponds via camera optics into spatial data in the object or, in this case, illumination plane. Therefore, from a determination of which pixels were illuminated, spatial information concerning the object contour can be determined. The collection of this spatial data as the object is sequentially moved across the illumination plane results in a set of surface data which completely describes the three-dimensional characteristics of the surface.

Figure 2:
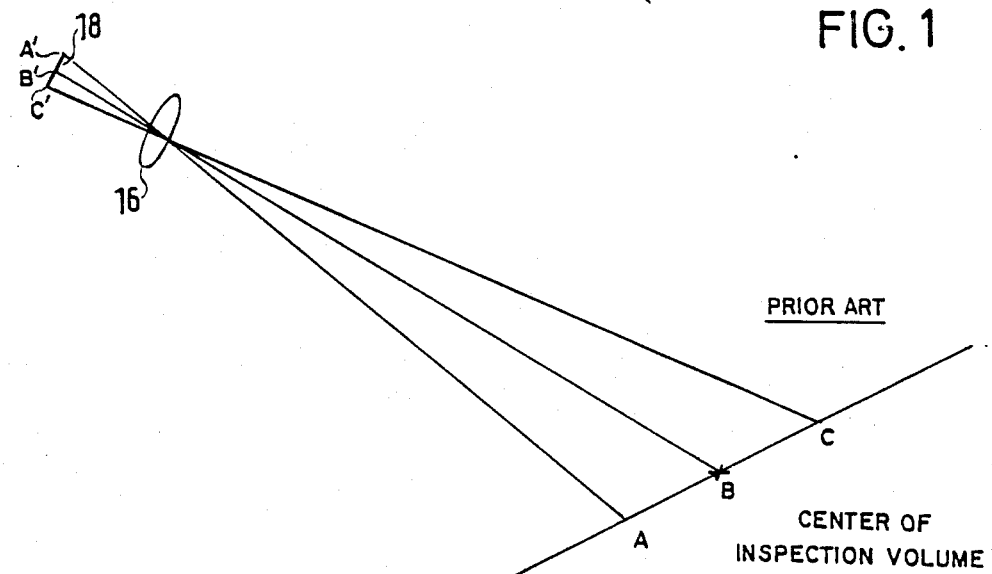
FIG. 2 is a diagrammatic view of the optical characteristics of the inspection system of FIG. 1.
Figure 2:
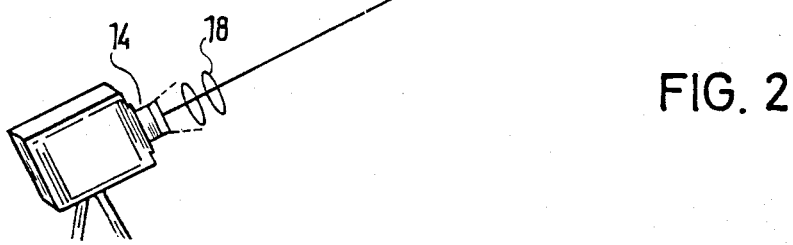

A plan view of the inspection system is shown in FIG. 2. The illumination source 14 with projector optics assembly 18 transmits radiant energy which is collected and shaped to generate a thin plane of illumination in focus over the inspection volume, shown in FIG. 2 from A to C. Details of generating a plane of illumination are well known in the field and are not described further here. The camera focusing optics 16 focuses illumination plane ABC onto the TV camera photosensitive array 18 as A'B'C'. Details of camera positioning and related lensing are well known in the field and are not described further here.

An object positioned to intersect the projector illumination plane at A results in an image which illuminates the camera sensor pixels at A' while an object positioned at C results in pixels at C' being illuminated. An object whose dimensional characteristics varies in a direction orthogonal to the plane of FIG. 2 results in intersections with the laser plane which varies, over the height of the object, from A to C. Since this is imaged on the area sensor, the column location of the pixel illuminated on each row will vary according to the dimensional characteristics versus height. A definite correspondence exists between pixel location and object dimension.

To maximize the accuracy of such optical inspections, the pixel illuminated must be accurately determined. Sensors available today have several problems which limit system performance. They include dynamic range limitations of the sensor arrays and charge bleeding or blooming of pixels which are overdriven. The nominal dynamic range presently available from photosensitive arrays is limited to approximately 40 db. However, restraints due to real-time processing further limits the available range resulting in a useful dynamic range of approximately 26 db. Surface characteristics and reflectivity variations can result in energy variations in excess of 60 db. Most objects which have local curvatures or edges can result in reflected energy which varies in excess of 26 db over the inspected height or with angular position with respect to the projected plane. The 26 db sensor capability, therefore, severely limits the inspection capabilities. In addition, when the radiant energy exceeds the dynamic range charge accumulated in the pixel bleeds into adjacent rows and columns degrading or masking the dimensional data. A possible solution to the above problems is to take many inspections at varying transmitted radiant energy levels. This, however, is very time-consuming and requires an object to be stationary during the inspection.

Figure 3:
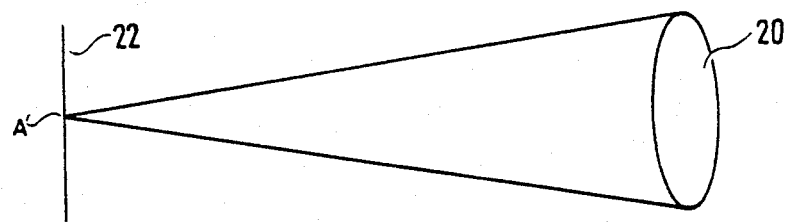
FIG. 3 shows schematically a camera module as used in the system of FIG. 1.

To meet the object of the present invention to provide an increased inspection capability independent of surface characteristics and reflectivities, an arrangement is provided for extending the dynamic range of the camera module. FIG. 3 shows an existing camera module arrangement. Radiant energy from an object is collected by the lens 20 and imaged at A' on image sensor 22. All the radiant energy collected by the lens is imaged at A'.

Figure 4:
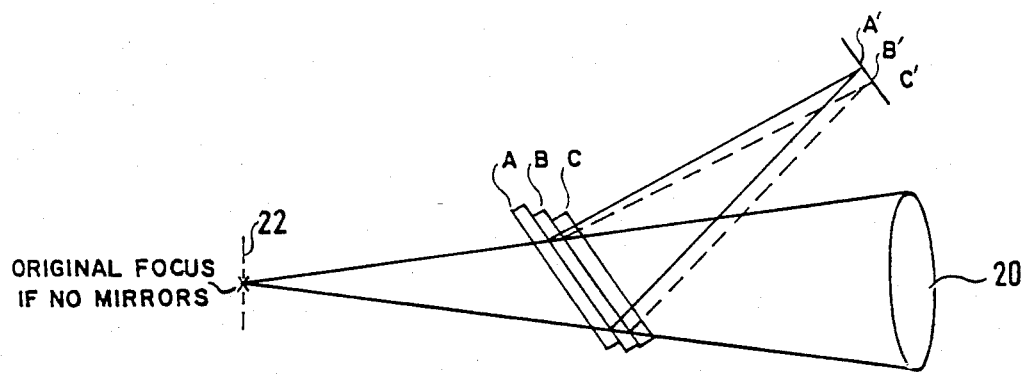
FIG. 4 is a schematic view of the arrangement used in the present invention for extending the sensor dynamic range.

FIG. 4 shows a simplified version of the present invention. A 100% reflecting mirror A is used to fold the image plane to form an image at A' where the image sensor is now placed. An additional partially reflecting mirror is located at B. The portion of the energy reflected by B forms an image at B'. The energy which passes through B is now reflected by mirror A and forms an image at A'. The energy at B' is related to the energy at A', the relationship determined by the partial mirror reflection coefficient. Selection of the mirror reflectivity so that the energy at B' differs from the energy at A' by the sensor useable dynamic range doubles the effective dynamic range of the sensor. If the incident energy at A' exceeds the sensor dynamic range but is less than twice the dynamic range than the energy incident at B' will be within the pixel dynamic range. Data at A' and B' is then evaluated and the data point which represents pixel outputs in its linear dynamic range is selected for further dimensional processing. Mirror spacing d is selected to give a pixel separation on the sensor area which exceeds the blooming effects caused by pixel overdrive. The mirrors are in intimate contact and are front surface mirrors to avoid undesired surface reflections. The addition of a third partially reflecting mirror at C will create an image at C'. The radiant energy at C' will be within the useful dynamic range of pixels at C' when radiant energy at A' is between two and three times the pixel dynamic range. Additional partially reflecting mirrors may be added to further increase dynamic range, each mirror adding an additional image on the sensor plane where each image irradiance is related to the reflection coefficients of the mirrors. N mirrors, therefore, result in N times the useful pixel dynamic range.

During each inspection, a set of images is formed on the image sensor. Amplitude data readout during each row must be evaluated to determine which image data is to be used. The output from A' is measured and if it exceeds an amplitude value representative of blooming, then the output corresponding to B' would be measured. This continues until the first acceptable data is measured. This data then represents non-blooming signal levels which represent the most accurate object dimensional information. As each row is scanned, the data from the most desirable image is selected and used to reconstruct the object contour.

Each partially reflecting mirror added to increase the useable dynamic range results in an additional image which uses area on the sensor and decreases the depth of the inspection region. In addition, each mirror thickness increases the optical path length and results in a misfocus between images at the sensor plane. This may be compensated for by increasing the depth of focus of the camera optics, or by repositioning the sensor to compromise between focusing on the illumination plane and focusing on the image sequence. The use of multiple mirrors makes system performance susceptible to degradation due to multiple internal reflections. Care must be exerted in the selection of surface coatings to minimize these internal reflections.

Figure 5:
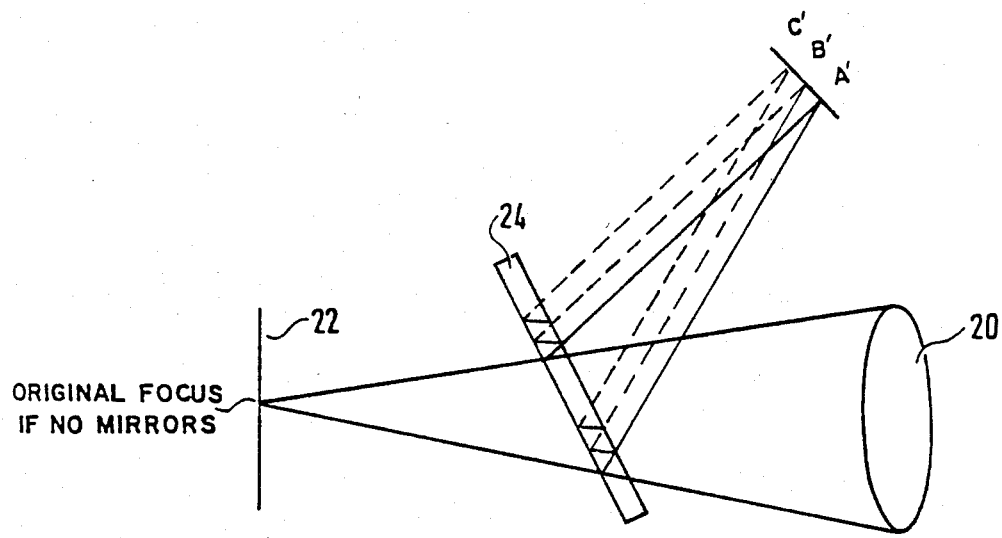
FIG. 5 is a schematic view of another embodiment of the present invention.

An alternative technique (FIG. 5) to using multiple mirrors is to use a single mirror 24 in which coatings on both the front surface and rear surface make use of internal reflections. The front surface is partially reflective, the reflection coefficient is selected to get the image amplitude relationship, while the rear surface is as close to 100% as possible. Successive internal reflections result in a series of images as shown in FIG. 5 similar to the multiple mirror technique. The mirror thickness is selected to give the desired image spacing.

Figure 6:
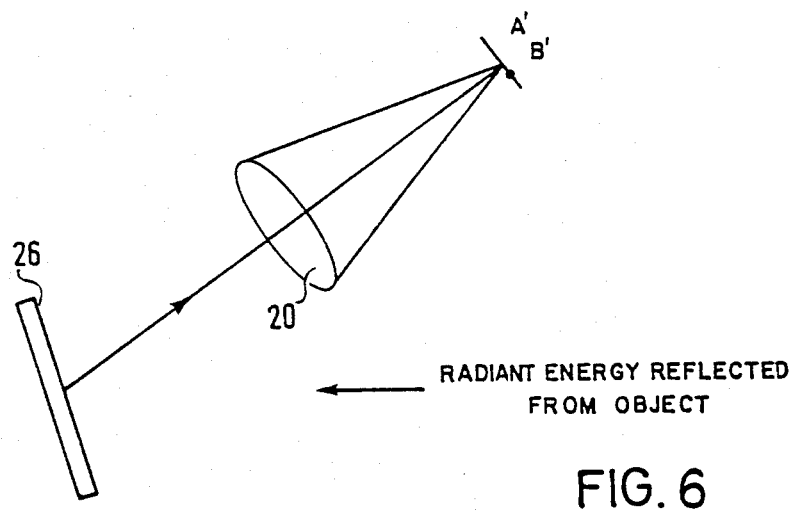
FIG. 6 is still a further embodiment of the present invention.

An alternative configuration to the multiple or single mirror techniques which are shown in FIGS. 4 and 5 is shown in FIG. 6. Here the mirror 26 is placed between the object plane and camera lens 20 instead of between the camera lens and image sensor. The arrangement as shown in FIG. 6 results in a series of energy related images which may be processed to optimize data as previously described. This mirror location also reduces the depth of field requirements of the camera lens, however, a larger mirror assembly is required than if the mirror assembly is after the camera lens.

The above technique may also be applied to multiple plane systems. Instead of a single projector plane as shown in FIG. 1, two or more planes are transmitted. The resultant image consists of groups of images, one group for each transmitted plane. The ambiguities between groups of planes may be solved by methods well known to those in the field. Within each group, the images are intensity-related and are processed to optimize data as described herein.

All the above descriptions use solid state cameras with finite arrays of pixels. The techniques however are directly applicable to vidicons or any electron beam scan techniques. In fact, the dynamic range of vidicons may be more limited than solid state cameras due to baseline shading and sensor blemishes. Therefore systems which use electron beam type cameras would benefit significantly by the techniques described here. The video data from these cameras is processed as described herein to optimize data over wide ranges of surface reflectivity characteristics.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. An arrangement for extending the dynamic range of sensor arrays comprising: image sensor means containing at least two sensing sites; means for imaging radiant energy from an object upon said image sensor means; and mirror means with partially reflecting surface means in the path of said radiant energy for generating a set of spatially displaced energy-related images of said object.

2. An arrangement as defined in claim 1, wherein said mirror means comprises a plurality of front-surface mirrors in intimate contact one behind the other in said path of said radiant energy.

3. An arrangement as defined in claim 2, wherein one of said mirrors is spaced furthest from said sensor means and is a substantially 100% reflecting mirror, at least one other mirror being partially reflective.

4. An arrangement as defined in claim 1, wherein said mirror means comprises a single mirror with coatings on both front and rear surfaces thereof, the rear surface being 100% reflective and the front surface being partially reflective for generating successive internal reflections to produce a series of images on said sensor means.

5. An arrangement as defined in claim 4, wherein the image spacing on said sensor means is dependent on the thickness of the mirror.

6. An arrangement as defined in claim 1, wherein said mirror means is located between the object and said means for imaging radiant energy.

7. An arrangement as defined in claim 1, wherein said mirror means is outside of the space between said sensor means and said means for imaging radiant energy from said object to said image sensor means.

8. A method for making measurements with extended image sensor dynamic range, comprising the steps of: radiating a pattern of radiant energy upon an object from a first angle; imaging reflections of said energy from said object upon image sensor means; receiving said energy with said image sensor means from a second angle different from said first angle; measuring output of said sensor means and using said sensor output values falling within predetermined dynamic range limits as valid measurement indicators.

* * * * *